United States Patent

Wariner

[15] 3,704,926
[45] Dec. 5, 1972

[54] WATER HEATER HOUSING FOR TRAVEL TRAILERS AND METHOD OF INSTALLING SAME

[72] Inventor: Derek C. Wariner, Fremont, Calif.

[73] Assignee: National Steel Construction Co., Newark, Calif.

[22] Filed: May 17, 1971

[21] Appl. No.: 143,996

[52] U.S. Cl. .................................. 312/242, 296/37
[51] Int. Cl. .......................... A47b 67/02, B60r 5/00
[58] Field of Search ............. 312/242, 213, 101, 102; 52/19–21, 204; 296/23, 24, 37; 49/50 LX

[56] References Cited

UNITED STATES PATENTS

| 264,172 | 9/1882 | Laskey | 312/242 UX |
| 449,593 | 3/1891 | Scott | 312/101 UX |
| 1,869,807 | 8/1932 | Hammer | 312/213 X |
| 2,730,106 | 1/1956 | York | 312/242 X |
| 3,203,747 | 8/1965 | Vercellcotti | 312/242 |

Primary Examiner—Paul R. Gilliam
Attorney—Christensen & Sanborn

[57] ABSTRACT

After the trailer has a wall in place for the enclosure thereof, an open-ended casing for the heater is installed in an opening in the wall, with the open end of the casing adjacent to the relatively outside face of the wall. Also, a structural frame is formed on the body of the trailer about the opening, adjacent the aforesaid outside face of the wall, and an outer wall for the enclosure is juxtaposed on the opposite side of the frame from the first mentioned wall, with an opening in the outer wall that registers with the open end of the casing. Then, an apertured cover is registered with the open end of the casing, adjacent the opening in the outer wall, and the casing and cover are secured to the frame.

9 Claims, 2 Drawing Figures

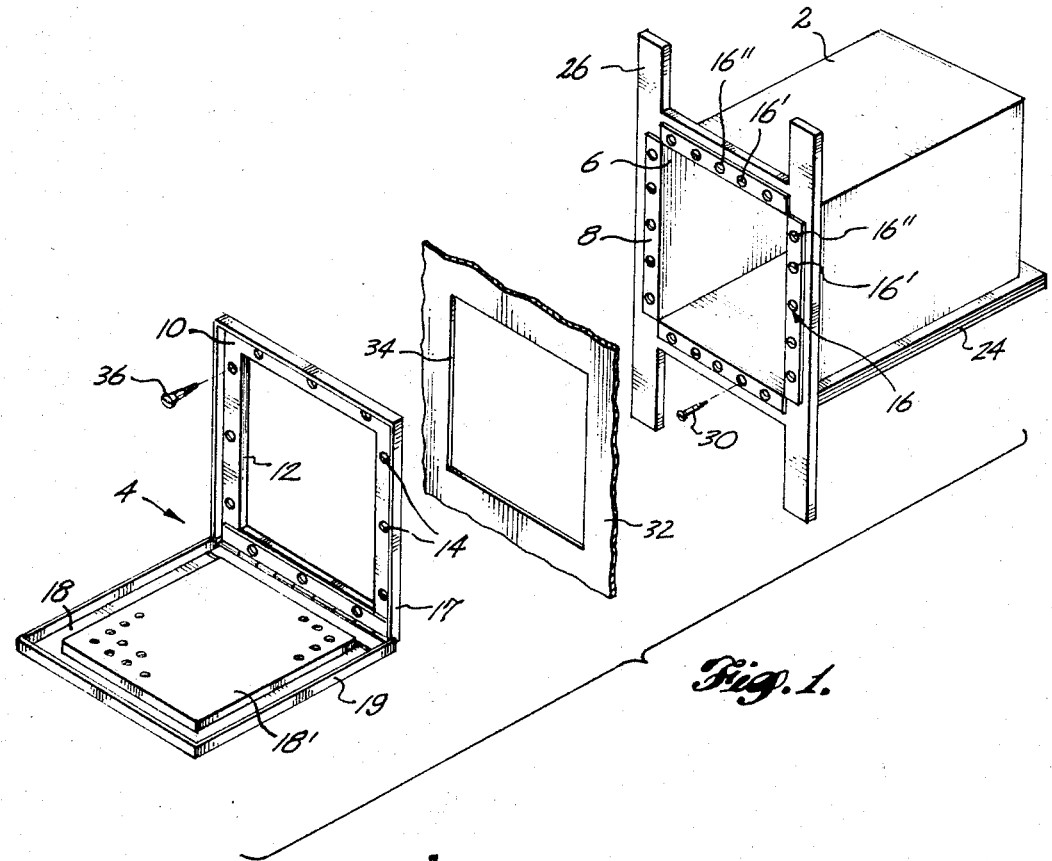
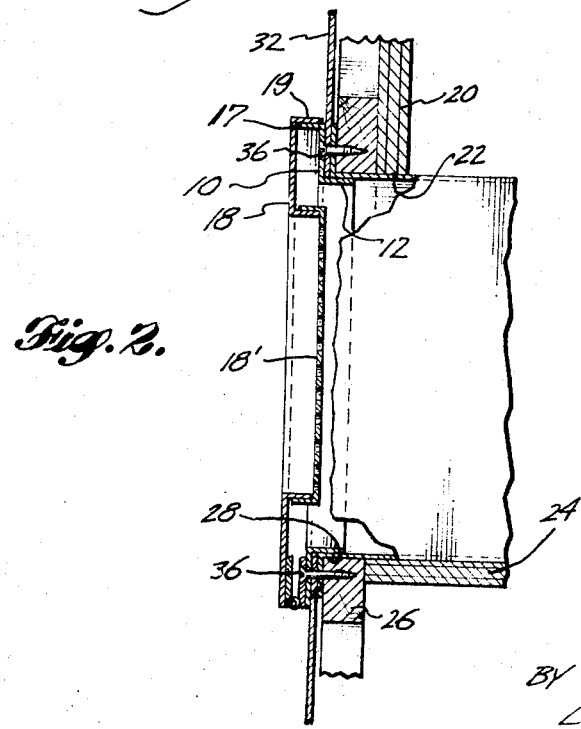

WATER HEATER HOUSING FOR TRAVEL TRAILERS AND METHOD OF INSTALLING SAME

FIELD OF THE INVENTION

This invention relates to the installation of fuel burning heaters or the like in mobile homes, travel trailers or the like -hereinafter simply called travel trailers- and in particular, to a two-part housing for such heaters, and to a method for installing the housing on such trailers.

BACKGROUND OF THE INVENTION INCLUDING CERTAIN OBJECTS THEREOF

The housings of fuel burning water heaters for travel trailers must open to the ambient atmosphere about the trailers in order to discharge the gases of combustion into the atmosphere. Accordingly, it has been the practice to house each such heater in a flanged open-ended casing which is inserted into an opening in the double-walled body of the trailer, and secured to the same by fastening the flange to the outer wall or skin of the trailer, and perhaps through the skin to a frame in the clearance between the walls. Afterward, when the heater has been checked and is ready for use, a ventilating cover is put over the open end of the casing to complete the assembly.

The completed assembly is generally free from problems, but the assembly process itself is time consuming and often contributes to a delay in other stages of the trail construction process, because of the necessity for prefitting and testing the heater before the skin is put on. In short, the heater is normally installed twice, first, in an opening in the inner wall alone, so that the heater can be connected with the fuel and water lines, filled with water, and then checked under operational conditions; and second, in a corresponding opening in the skin, after the heater has been first removed from the trailer and the skin added, so that skin will reach under the flange when the heater is replaced in the final assembly.

One object of the present invention is to provide a method and apparatus whereby the necessity for such a two step operation is avoided. Another object is to provide a method and apparatus of this nature whereby after the heater and/or the housing is installed in the inner wall, the balance of the trailer construction process can proceed to completion without the necessity for first removing the heater and the housing from the wall. A further object is to provide a method and apparatus of this nature whereby the heater and/or housing can be installed in the inner wall of the trailer, connected and tested, and then left in place while the trailer construction process is completed. Other objects include the provision of a method and apparatus of this nature whereby the heater and/or housing can be preinstalled and left in place in this fashion, without sacrificing the structural and/or leak-proof integrity of the housing; and in fact, in a way which improves the integrity of the housing by incorporating a built-up rim about the open end of the casing, that is tightly clamped to the flange of the casing and includes the skin of the trailer. Still further objects will become apparent from the description of the invention which follows hereafter.

SUMMARY OF THE INVENTION:

These objects and advantages are realized by a method and apparatus of my invention wherein a frame is formed about an opening in the inner wall of the enclosure of the trailer, before the outer wall is superposed thereover, and the frame comprises spaced, parallel framing members that are disposed opposite the relatively outside face of the inner wall, adjacent the rim of the opening, and that are adapted be interposed between the walls of the enclosure, in the space there between, when the outer wall is superposed over the inner wall. The frame is secured to the inner wall, and vice versa, and an open-ended casing for the heater is installed in the space between the framing members, so that the open end of the casing terminates in a plane adjacent the relatively outside face of the framing members, and the casing otherwise projects into the enclosure through the opening in the inner wall. Thereafter, the outer wall is superposed over the outside face of the frame, in a plane relatively outside the aforesaid terminal plane of the casing.

The outer wall is provided with an opening therein, which registers with the open end of the casing, and an apertured cover is registered with the end opening of the casing, opposite the relatively outside face of the outer wall, adjacent the rim of the opening therein. The cover is equipped with a flange which is telescoped into the end opening of the casing, and the casing and the cover are secured to the frame so as to lock each to the body of the mobile home or trailer about the opening in the casing.

More particularly, the cover is secured to the outer wall, and the outer wall is secured in turn to the frame. Preferably, the cover is applied against the relatively outside face of the outer wall, and the casing has an outturned flange thereon which is interposed between the frame and one of the walls, and interconnected with the cover by fasteners passed through the cover, and the outer wall, and into the flange of the casing and the frame. In fact, in the presently preferred embodiments of the invention, the flange on the casing is interposed between the frame and outer wall, and the flange and the outer wall are clamped between the cover and the frame by the fasteners.

The cover may comprise an annular frame which is secured to the rim of the opening in the outer wall, and a door which is pivotally attached to the annular frame to cover the opening therein, in the closed position thereof.

These features will be better understood by reference to the accompanying drawing which illustrates both the method and the apparatus of the invention when such a double-framed cover arrangement is used to complete the housing of a water heater on a travel trailer.

BRIEF DESCRIPTION OF THE DRAWINGS:

In the drawing

FIG. 1 is an exploded perspective view of the housing as it would be mounted on the trailer, although the trailer is largely omitted; and FIG. 2 is a cross-sectional view of the housing when assembled and mounted on the trailer.

DESCRIPTION OF THE PREFERRED EMBODIMENT:

Referring to the drawing, it will be seen that the housing for the heater (not shown) is in two parts, one of which comprises an open-ended casing 2, and the other of which comprises an apertured cover 4 for the open end 6 of the casing. The casing has an outturned lip or flange 8 on the open end 6 thereof, and the cover 4 comprises a reversedly flanged quadrilateral bar frame 10, the outline of which compares with, but is slightly greater than the outline of the flange 8. Moreover, the rearwardly projecting inner peripheral flange 12 of the frame is sized to slidably engage in the open end 6 of the casing; and the bodies of the frame 10 and the flange 8 have apertures 14 and 16, respectively, therein which are distributed about their perimeters to receive various fasteners, as shall be explained, there being a greater number in the flange 8 than in the shall flame however, for reasons which shall also be explained. The forwardly projecting outer peripheral flange 17 of the frame 10, appears only on the upper and vertical side edges thereof; and the cover 4 also comprises a door 18 which is piano-hinged to the unflanged bottom edge of the frame 10 and equipped with a rearwardly projecting flange 19 on the upper and vertical side edges thereof, to enclose the frame, there being a relatively inwardly embossed center section 18' of perforated or expanded sheet metal material on the door which inserts within the inner peripheral flange 12 of the frame when the door 18 is in the closed position thereof.

The heater is carried in the casing 2, and after the inner plywood wall 20 of the trailer is in place, the casing is mounted on the trailer, with the cover, in a series of steps which involve firstly, cutting or otherwise forming an opening 22 in the wall 20, above, but flush with either the bottom of the trailer or a bench, shelf or other support 24 formed on or adjacent the wall 20. Next, an H-frame 26 or some other form of annular frame is formed on the body of the trailer about the opening 22, and adjacent the outside face of the wall 20, using suitable structural material having a thickness no greater than the clearance provided later between the inner and outer walls of the trailer. The opening 28 in the H-frame 26 is sized to correspond with the opening 22 in the inner wall 20 of the trailer, and the frame 26 itself is preferably secured directly to the wall 20 by means of nails, screws or other such fasteners (not shown) driven into the wall about the opening 22 therein. The frame 26 then becomes a backing for the flange 8 of the casing 2 when the casing is inserted through the openings 28 and 22 in the frame 26 and the inner wall 20, and rested on the support 24 therebehind. Thereafter, the casing 2 is firmly secured to the frame 26 by means of screw nails 30 or the like which are passed through alternate holes 16' in the flange 8 about all sides of the casing 2. Optionally, the casing 2 may be inserted through the openings 28 and 22 in the frame and the inner wall, and then a single set of fasteners 30 used both to secure the casing to the frame 26, and to secure the frame 26 in turn to the inner wall 20.

At this point, in any case, the gas and water lines (not shown) for the heater are normally connected to the heater, and the heater and lines are fully tested for leaks and other such operational defects.

The construction of the trailer then proceeds in conventional fashion by the addition of the outer wall or thin metal skin 32 of the same, which is superimposed on the H-frame 26 in the region of the heater, but with an opening 34 cut or otherwise removed therefrom to correspond to and register with the open end 6 of the casing.

Finally, the cover 4 is added to the assembly, by first applying a sealant to the inverse face of the frame 10 thereof, then applying the frame 10 to the outside face of the skin 32 while inserting the flange 12 through the opening 34 therein, and then lastly, firmly securing the frame 10 to the assembly by passing lengthy screws 36 through the apertures 14 in the frame 10 which in turn pass through the skin 32 and the remaining apertures 16'' in the flange 8 of the casing, to seat in the H-frame 26. The remaining apertures 16'' in the flange 8 register with the apertures 14 in the frame 10 of the cover 4 for this purpose; and in addition to anchoring the cover, the screws 36 also operate to tightly clamp the entire assembly 4, 32, 26, 2, 20, both for structural soundness and for the prevention of gas leaks at the open end 6 of the casing 2.

What is claimed is:

1. In the manufacture of a mobile home, travel trailer or the like, the body of which when manufactured, has a double-walled enclosure therein, the inner and outer walls of which are spaced apart from one another, a method of installing a housing for a water heater or the like on the body of the mobile home or trailer, comprising forming a frame about an opening in the inner wall of the enclosure, before the outer wall is superposed thereover, which frame comprises spaced, parallel framing members that are disposed opposite the relatively outside face of the inner wall, adjacent the rim of the opening, and adapted to be interposed between the walls in the space therebetween, when the outer wall is superposed over the inner wall; securing the frame to the inner wall, and vice versa; installing an open-ended casing for the heater in the space between the framing members, so that the open end of the casing terminates in a plane adjacent the relatively outside face of the framing members, and the casing otherwise projects into the enclosure through the opening in the inner wall; thereafter superposing the outer wall over the outside face of the frame, in a plane relatively outside the aforesaid terminal plane of the casing, and providing the outer wall with an opening therein which registers with the open end of the casing; registering an apertured cover with the end opening of the casing, which cover is disposed opposite the relatively outside face of the outer wall, adjacent the rim of the opening therein, and equipped with a flange which is telescoped into the end opening of the casing; and securing the casing and the cover to the frame so as to lock each to the body of the mobile home or trailer about the opening in the casing.

2. The method according to claim 1 wherein the cover is secured to the rim of the opening in the outer wall, and the rim is secured in turn to the framing members.

3. The method according to claim 1 wherein the casing has an outturned flange thereon which is interposed between the framing members and the rim of the opening in the outer wall.

4. The method according to claim 3 wherein the casing and the cover are secured to the frame by fasteners, each of which is individually passed through the cover, then through the rim of the opening in the outer wall, then through the flange of the casing, and then into the framing members.

5. A mobile home, travel trailer, or the like, the body of which has a double-walled enclosure therein, the inner and outer walls of which are spaced apart from one another, and have mutually opposing openings therein, and a frame interposed in the space therebetween, comprising spaced, parallel framing members that are disposed opposite the relatively outside and inside faces of the inner and outer walls, respectively, adjacent the rims of the openings, and secured to the inner wall, and vice versa, and a housing for a water heater or the like, having a two-part construction, one part of which comprises an open-ended casing for the heater that is installed in the space between the framing members, so that the open end of the casing terminates in a plane adjacent the relatively outside face of the framing members, but inside of the outer wall, and the casing otherwise projects into the enclosure through the opening in the inner wall, and the other part of which comprises an apertured cover that is registered with the open end of the casing, opposite the relatively outside face of the outer wall, adjacent the rim of the opening therein, and equipped with a flange which is telescoped into the end opening of the casing, the casing and the cover being secured to the frame so as to be locked to the body of the mobile home or trailer.

6. The mobile home or travel trailer according to claim 5 wherein the cover is secured to the rim of the opening in the outer wall, and the rim is secured to the framing members.

7. The mobile home or travel trailer according to claim 5 wherein the casing has an outturned flange thereon which is interposed between the framing members and the rim of the opening in the outer wall.

8. The mobile home or travel trailer according to claim 7 wherein the flange on the casing, and the outer wall, are clamped together between the cover and the frame.

9. The mobile home or travel trailer according to claim 5 wherein the cover comprises an annular frame which is secured to the rim of the opening in the outer wall, and a door which is pivotally attached to the annular frame to cover the opening therein, in the closed position thereof.

* * * * *